July 27, 1954  C. M. SUMSTAD  2,684,532
HEDGE AND LAWN TRIMMER ATTACHMENT
Filed June 4, 1951
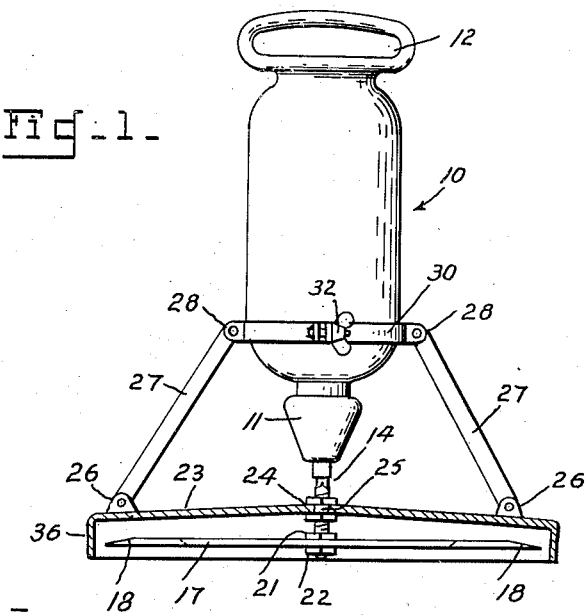
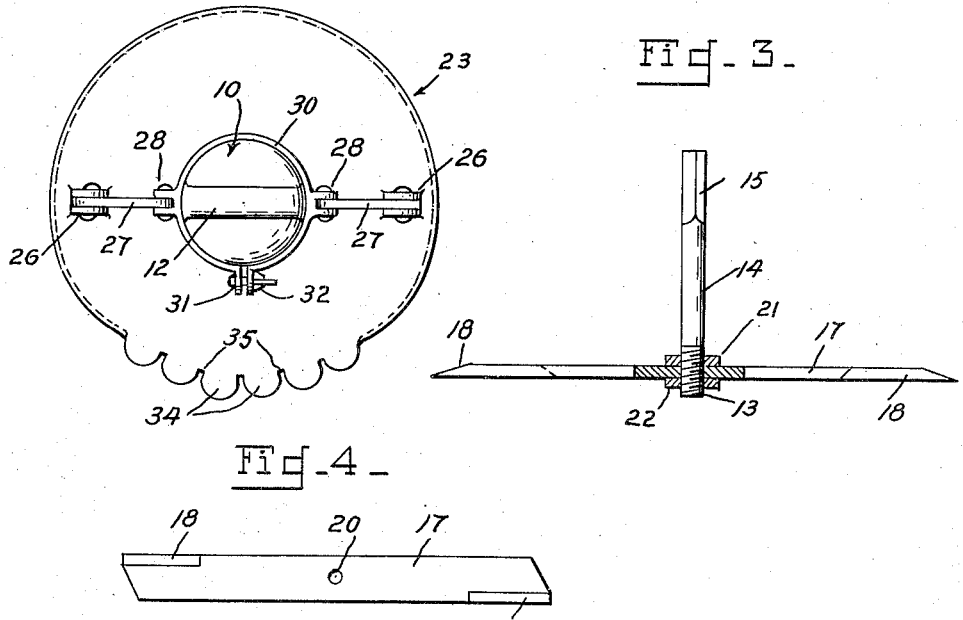
INVENTOR.
Clarence M. Sumstad,
BY *Gustav Miller*
ATTORNEY Patented July 27, 1954

2,684,532

UNITED STATES PATENT OFFICE 2,684,532

HEDGE AND LAWN TRIMMER ATTACHMENT

Clarence M. Sumstad, Stockton, Calif.

Application June 4, 1951, Serial No. 229,715

1 Claim. (Cl. 30—276)

This invention relates to a hedge and lawn trimmer attachment particularly intended for use as an attachment to an electric drill motor, motor housing and chuck, and has for an object to provide an improved hedge and lawn trimmer attachment which may be easily and readily and detachably attached to any existing electric drill motor and motor housing having the customary drill chuck to which a drill bit is ordinarily attached.

A further object of this invention is to provide a hedge and lawn trimmer attachment readily attached to an electric and power drill mechanism so that such mechanism may be used for trimming the grass or trimming a hedge and then may be readily and easily detached so that the drill mechanism may be used for its customary purpose of operating a drill.

A further object of this invention is to provide a hedge and lawn trimmer attachment which may be readily attached to and detached from an electric power drill mechanism of any suitable size, the attachment being made larger for large size drill mechanisms, and smaller for small size drill mechanisms.

Yet a further object of this invention is to provide a hedge and lawn trimmer attachment having a rotating blade which may be powered by a shaft securable in the drill chuck, and provided with a shield readily attachable to and detachable from the drill motor housing, the shield being provided with a guarding flange along the rear portion of its arc so as to protect the operator from the rotating blades and provided with serrated teeth at the forward edge of its arc, the teeth cooperating with the rotating blade so that the hedge portions or grass may be held between the teeth while the blade cuts therethrough.

With the foregoing and other objects in view, this invention comprises the combination, construction and arrangements of parts hereinafter set forth, claimed and disclosed in the accompanying drawings, wherein:

Fig. 1 is an elevational view of the hedge and lawn trimmer attachment of this invention in operative position attached to an electric drill motor housing and chuck;

Fig. 2 is a top plan view of Fig. 1;

Fig. 3 is an elevational partly sectional view of the rotary blade and chuck shaft therefor; and Fig. 4 is an elevational view of the rotary blade.

There is shown at 10 a conventional electric drill motor housing having a motor therewithin for rotating a conventional chuck 11 at one end and provided at its other end with a handle 12.

The hedge and lawn trimmer attachment of this invention includes a shaft 14 having a shank end 15 adapted to fit within and cooperate with the jaws of the chuck 11. The other end of the shaft 14 is threaded as at 16. A rotary blade 17 is provided with diametrically opposite sharpened edges 18 and a shaft receiving aperture 20 at the center thereof.

The blade 17 is secured on the shaft 14 by first placing a locking nut 21 over the threaded ends, then placing the blade aperture 20 thereover, then placing a securing nut 22 at the lower side thereof. The nut 22 will be adjusted to properly position the blade 17 and then the nut 21 will be tightened against the opposite side to lock the blade securely to the threaded end 16 of the shaft 14.

A blade shield 23 is provided having an opening 24 at its center, through which the shaft 14 extends when secured in the chuck 11. If desired, a bearing 25 may be mounted in the shield aperture 24 so that the shaft 14 may be journaled in the bearing 25 to assist in holding the shaft 14 steady in its rotation. On the top surface of the shield 23 a plurality of pairs of apertured ears 26 are provided for pivotally securing an attaching arm 27 between each pair of ears 26. The other ends of each attaching arm 27 are arranged to be secured between pairs of ears 28 integrally secured on a metal strap or band 30. The strap or band 30 is discontinuous at one point, and provided at such point with outwardly turned flanges 31 having apertures therethrough so as to receive a wing bolt and nut 32 therethrough. The band flanges 31 are normally spaced somewhat apart so that the internal diameter of the band 30 is slightly larger than the external diameter of the motor housing 10, whereby the wing bolt and nut 32 may be tightened to securely hold the band 30 about the motor housing 10. Wing bolts and nuts may be provided through either or both of the sets of ears 26 and 28 so as to permit ready attachment or separation of these parts, and by providing removable pivoting means in at least either the ears 26 or the ears 28, the attaching arms 27 may be folded to occupy a minimum amount of storage space when the attachment is not in position on a motor housing 10.

At the forward arc of the shield 23 where the cutting is to take place, the forward edge of the shield 23 is provided with a plurality of indented serrated teeth 34 having indentations 35 into which the grass or hedge twigs may extend and be held while the blade 17 brings its sharpened edge 18 thereagainst. The diameter of the shield 23 at least at the indentations 35 will be slightly less than the diameter of the blade 17, but beyond this area, the arc of the remaining shield will have a diameter greater than the overall diameter of the blade 17, and in such arc of greater diameter, the shield 23 will be provided with a depending guard flange 36 preventing any possibility that the rotating blade edge 18 may injure the operator. In operation, the attachment may be readily put in position on a motor housing by merely securing the attaching arms 27 between the shield 23 and the band 30 and then fastening the band 30 in position by means of the wing bolt and nut 32. Next the blade 17 with shaft 14 attached will be inserted through the aperture in the shield or through the journal bearing 25 and have its chuck end 15 secured in the drill chuck 11. The hedge and lawn trimmer attachment will then be ready for operation to cut grass or trim a hedge. Then when the hedge or lawn trimming job is finished, the wing bolt and nut 31 and chuck 11 may be loosened permitting the attachment to be readily removed from the motor housing 10 and permitting the drill mechanism to be used for its conventional purpose of operating a drill bit or the like.

While the device has been shown and the structure described in detail, it is obvious that this invention is not to be considered as being to the exact form disclosed, and that changes in detail and construction may be made therein within the scope of what is claimed, without departing from the spirit of this invention.

Having thus set forth and disclosed the nature of this invention what is claimed is:

A hedge and lawn trimmer attachment for an electric drill motor having a motor housing and chuck, a shaft having a shank at one end arranged to be secured in the drill chuck in driving relationship therewith, the opposite end of said shaft being externally threaded, a long, narrow blade having two diametrically opposite sharpened edges and a central opening therein received on said shaft, nut means cooperating with said threaded shaft end on opposite sides of said blade for adjustably securing and locking the blade on said shaft, a generally circular shield of larger diameter than said blade, said shaft between its chuck and blade ends journaling said shield, means for detachably securing said shield to the motor housing when said shaft is secured in the chuck, said last mentioned means including a split band to be clamped to the side wall of the motor housing and a pair of arms pivoted to said band at opposite points thereof with said arms also pivoted to said shield at opposite marginal points thereof, a continuous guard flange extending downwardly from the edge of said shield throughout substantially the rearward three-quarter arc of rotation of said blade, the shield in the remaining forward quarter arc of rotation of said blade having teeth extending in the same plane as the main body of said shield and there being intervening indentations between said teeth extending inwardly to within the rotational arc of the sharpened blade edges to provide shear cooperating elements cooperating with said blade for severing vegetation material received within said indentations.

References Cited in the file of this patent

UNITED STATES PATENTS

| Number | Name | Date |
|---|---|---|
| 1,239,489 | Jackson | Sept. 11, 1917 |
| 1,797,028 | Snyder | Mar. 17, 1931 |
| 2,041,924 | Hanson | May 26, 1936 |
| 2,062,820 | Pierce | Dec. 1, 1936 |
| 2,091,827 | Mercatoris | Aug. 31, 1937 |
| 2,256,779 | McHenry | Sept. 23, 1941 |